(12) United States Patent  
Garde

(10) Patent No.: US 9,821,462 B2  
(45) Date of Patent: Nov. 21, 2017

(54) METHOD FOR DISCONNECTING A MANUAL CONTROL UNIT FROM A MULTI-AXIS ROBOT AND ROBOT FOR IMPLEMENTING SUCH A METHOD

(71) Applicant: Staubli Faverges, Faverges (FR)

(72) Inventor: Louis Garde, Annecy (FR)

(73) Assignee: STAUBLI FAVERGES, Faverges (FR)

( * ) Notice: Subject to any disclaimer, the term of this patent is extended or adjusted under 35 U.S.C. 154(b) by 28 days.

(21) Appl. No.: 14/930,850

(22) Filed: Nov. 3, 2015

(65) Prior Publication Data

US 2016/0136814 A1     May 19, 2016

(30) Foreign Application Priority Data

Nov. 18, 2014    (FR) ...................................... 14 61134

(51) Int. Cl.
    *B25J 9/16*            (2006.01)
    *B25J 13/00*          (2006.01)
    (Continued)

(52) U.S. Cl.
    CPC .............. *B25J 9/1674* (2013.01); *B25J 13/00* (2013.01); *B25J 13/06* (2013.01); *B25J 19/06* (2013.01); *G05B 9/02* (2013.01); *G05B 19/406* (2013.01)

(58) Field of Classification Search
    CPC ........ G05B 2219/50198; G05B 19/058; G05B 19/406; G05B 2219/39447;
    (Continued)

(56) References Cited

U.S. PATENT DOCUMENTS 5,444,342 A * 8/1995 Matsuo .................. B25J 9/1674
                                                                             318/563
5,587,640 A * 12/1996 Ek ......................... G05B 19/406
                                                                             318/364

(Continued)

FOREIGN PATENT DOCUMENTS

DE         4315991       11/1994
EP          1898280        3/2008

OTHER PUBLICATIONS

Search Report in corresponding FR Application No. 1461134.

*Primary Examiner* — Ryan Rink
(74) *Attorney, Agent, or Firm* — Dowell & Dowell, PC

(57) ABSTRACT

This method relates to the disconnection of a manual control unit of a multi-axis robot, including a connecting cord for connecting the unit to a controller. The cord includes an input power line and output power line for each of the two cabling circuits of an emergency stop button, and an input power line and output power line for each of the two cabling circuits of a dead man contactor. The method comprises successive steps, in which:
    a) an operator makes a request to disconnect the unit,
    b) during a predetermined length of time, the safety controller does not trigger an emergency stop based on the control of the electrical cabling circuits,
    c) at the end of the predetermined length of time, the safety controller does not trigger an emergency stop if and only if, on the one hand, only one of the two cabling circuits of the emergency stop button is open and, on the other hand, only one of the two cabling circuits of the dead man contactor is open.

9 Claims, 2 Drawing Sheets

(51) Int. Cl.
  *B25J 19/06* (2006.01)
  *G05B 9/02* (2006.01)
  *G05B 19/406* (2006.01)
  *B25J 13/06* (2006.01)

(58) Field of Classification Search
  CPC ...... G05B 19/0428; G05B 2219/36159; G05B 19/048; G05B 9/02; B25J 19/06; B25J 9/1674; B25J 13/00; B25J 13/06
  See application file for complete search history.

(56) References Cited

U.S. PATENT DOCUMENTS

| | | | | |
|---|---|---|---|---|
| 6,459,956 B2 * | 10/2002 | Matsumoto | ............... | F16P 3/00 318/563 |
| 2003/0018411 A1 * | 1/2003 | Suita | .................... | G05B 19/409 700/245 |
| 2007/0096674 A1 * | 5/2007 | Hashimoto | ............ | B25J 9/1674 318/568.13 |
| 2008/0221726 A1 * | 9/2008 | Rotzler | ................ | G05B 19/042 700/213 |
| 2012/0187777 A1 * | 7/2012 | Fischbach | .......... | G05B 19/0428 307/326 |
| 2016/0031077 A1 * | 2/2016 | Inaba | .................... | B25J 9/0081 700/264 |

* cited by examiner

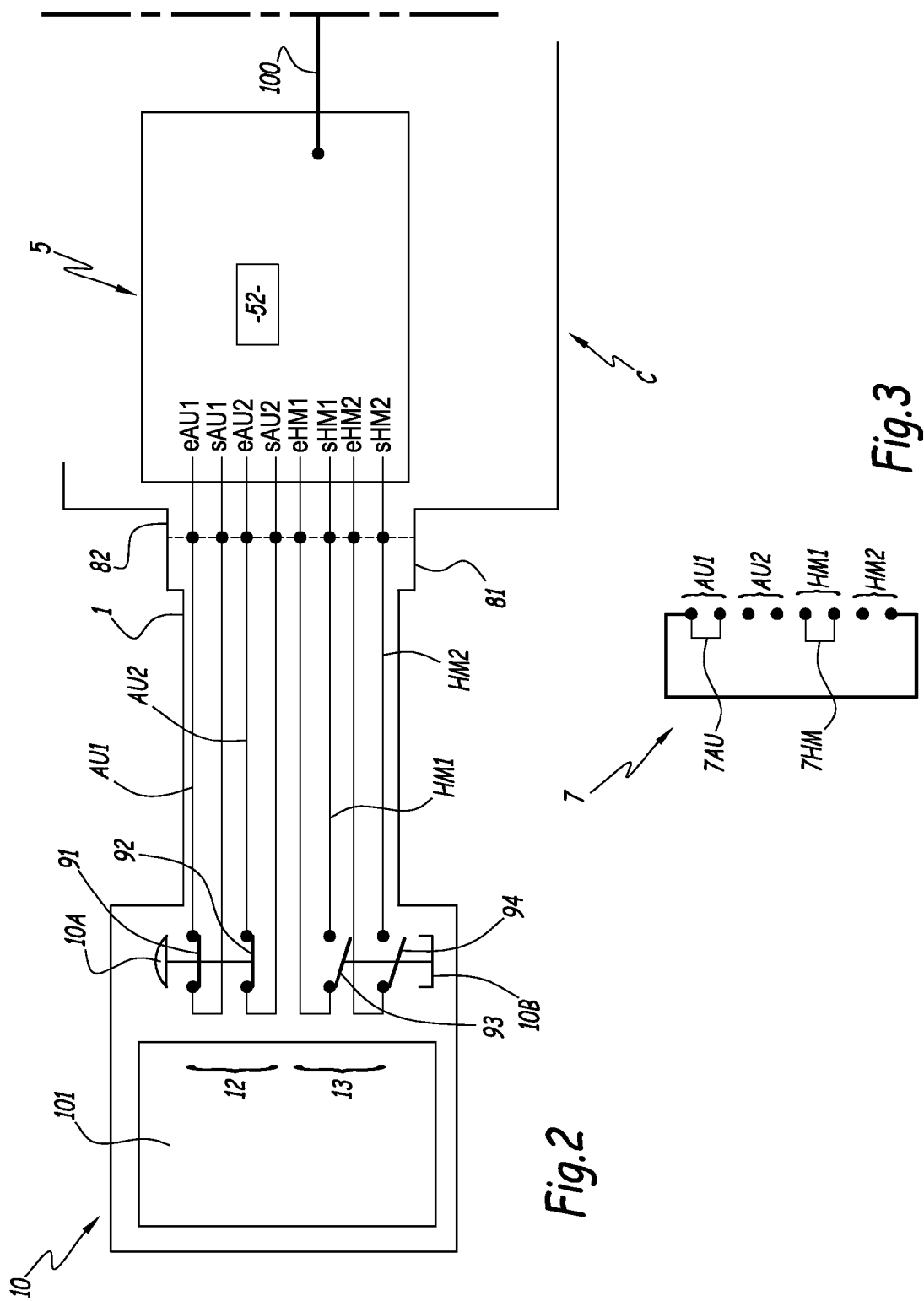

METHOD FOR DISCONNECTING A MANUAL CONTROL UNIT FROM A MULTI-AXIS ROBOT AND ROBOT FOR IMPLEMENTING SUCH A METHOD

The present invention relates to a method for disconnecting a manual control unit from a multi-axis robot, as well as a robot for implementing such a method.

It is known to equip a device for controlling a multi-axis robot arm with a manual command unit that allows an operator to send command orders to the robot, and to receive information relative to the operation of the robot, such as the positions of moving parts of the robot arm. The manual command unit makes it possible to select a manual operating mode of the robot, in order to move a moving part of the robot arm manually, for example during a trajectory learning phase, for a maintenance operation, or, following an emergency stop, to reposition the robot arm in an appropriate position.

The manual control unit generally has an emergency stop button and a dead man contactor that is deactivated by default, which includes a command button that must be activated manually during the use of the manual control unit. When the operator has completed his intervention using the manual control unit, he may need to disconnect the manual control unit, for example to connect it to a control unit of another robot arm. Without a particular device, the disconnection of the manual control unit automatically causes an emergency stop to be triggered.

To avoid such an activation of the emergency stop upon disconnection of the manual control unit, U.S. Pat. No. 5,444,342 proposes equipping the manual control unit with a connection/disconnection contactor of the manual control unit, which must be activated before disconnecting the manual control unit, to allow the disconnection. When this contactor is activated, the electric circuit of the emergency stop button is shunted, such that the disconnection of the manual control unit does not cause an emergency stop to be triggered. Furthermore, when the connection/disconnection contactor is activated, the supply of electricity to the functional circuits of the manual control unit is cut, such that it is impossible to use the manual control unit when the emergency stop button is not functional.

The solution of U.S. Pat. No. 5,444,342 is not in compliance with the new safety requirements, which require that the failure of an element does not compromise operator safety. For example, a failure of the electricity shut off device of the functional circuits of the manual control unit can allow the operator to use the manual control unit while the emergency stop button is deactivated.

In order to comply with safety constraints, the emergency stop button and the dead man contactor are each cabled on two independent power lines, which are connected to a safety controller able to detect any cabling anomalies and trigger the emergency stop. The structure requires replacing the connector of the manual control unit cord, connecting the unit to the robot control unit, with a stopper that closes the power lines of the emergency stop button so that the safety controller authorizes the operation of the robot. One drawback of this stopper is that the safety controller is not able to differentiate between the stopper of the manual control unit, which in particular does not allow setting up safety routines that depend on the presence or absence of the manual control unit.

The invention more particularly aims to resolve these drawbacks by proposing a method for disconnecting a manual control unit of a multi-axis robot making it possible to satisfy safety constraints.

To that end, the invention relates to a method for disconnecting a manual control unit for a multi-axis robot, the manual control unit including an emergency stop button, a dead man contactor and a cord connecting the manual control unit to a robot controller. The cord includes an input power line and an output power line for each of two cabling circuits of the emergency stop button and an input power line and an output power line for each of two cabling circuits of the dead man contactor. The robot controller includes a central processing unit able to execute programs for commanding the robot arm, and a safety controller able to test the two cabling circuits of the emergency stop button and the two cabling circuits of the dead man contactor, and trigger an emergency stop of the robot arm. According to the invention, the method comprises successive steps, in which:

a) an operator makes a request to disconnect the manual control unit, b) during a predetermined length of time started upon the disconnection request, the safety controller suspends the control of the two electrical cabling circuits of the emergency stop button and of the two cabling circuits of the dead man contactor so as not to trigger the emergency stop, c) at the end of the predetermined length of time, the safety controller does not trigger an emergency stop of the robot arm if and only if, on the one hand, only one of the two cabling circuits of the emergency stop button is open and, on the other hand, only one of the two cabling circuits of the dead man contactor is open.

Owing to the invention, the manual control unit can be disconnected without triggering an emergency stop. Furthermore, when the manual control unit is not disconnected after a predetermined length of time, then the safety controller detects that at least one cabling circuit of the emergency stop button or the dead man contactor is not in the expected state and triggers the emergency stop.

The specific stopper implemented in the invention allows the safety controller to detect the presence of the stopper with a high level of safety, similar to the safety level of the emergency stop, owing to two redundant signals from category 4/PLe according to standard ISO 13849-1 or SIL3 according to standard IEC62061. The improved safety level is achieved at no additional cost, and allows the central processing unit to differentiate easily between a lack of communication caused by an error of the device and a lack of communication caused by the presence of the stopper.

According to advantageous but optional aspects of the invention, such a method may incorporate one or more of the following features, considered in any technically allowable combination:

During step b), an operator connects a stopper to the robot controller in place of the cord, the stopper closing only one of the two cabling circuits of the emergency stop button and closing only one of the two cabling circuits of the dead man contactor.

Advantageously, the method then further comprises subsequent steps in which:

a') an operator removes the stopper, b') during a second predetermined length of time starting upon removal of the stopper, the safety controller suspends the control of the two electrical cabling circuits of the emergency stop button and the two cabling circuits of the dead man contactor so as not to trigger the emergency stop, c') at the end of the second predetermined length of time, the safety controller triggers the emergency stop if the two cabling circuits of the emergency stop button are open and if the two cabling circuits of the dead man contactor are open.

During step a), the disconnection request is done using the manual control unit.

Advantageously, the disconnection request order is received by an interface, in particular a touchscreen of the manual control unit.

Alternatively, during step a), the disconnection request is done using a disconnection contactor connected to the safety controller.

Another aim of the invention relates to a multi-axis robot for implementing the method previously defined. This robot includes a manual control unit having an emergency stop button, a dead man contactor, and a connecting cord for connecting the manual control unit to a robot controller. The cord includes an input power line and output power line for each of the two cabling circuits of the emergency stop button, and an input power line and output power line for each of the two cabling circuits of the dead man contactor. The robot controller includes a central processing unit able to execute control programs of the robot arm, and a safety controller able to test the two cabling circuits of the emergency stop button and the two cabling circuits of the dead man contactor and to trigger an emergency stop of the robot arm, to implement the third step c). According to the invention, the robot further comprises a stopper able, when it is connected to the robot controller in place of the cord, to close only one of the two cabling circuits of the emergency stop button and only one of the two cabling circuits of the dead man contactor.

According to advantageous but optional aspects of the invention, such a robot may incorporate one or more of the following features, considered in any technically allowable combination:

The manual control unit comprises an interface, in particular a touchscreen, able to receive a disconnection request order.

The robot controller comprises a disconnection contactor connected to the safety controller and able to receive a disconnection request order.

The invention will be better understood upon reading the following description of a multi-axis robot and a method for disconnecting a manual control unit from such a robot, provided solely as an example and done in reference to the appended drawings, in which:

FIG. 2 is a diagram of the cabling of a manual control unit of the robot of FIG. 1 to the safety controller; and FIG. 3 is a cabling diagram of a stopper of the robot of FIG. 1.

Figure 1:
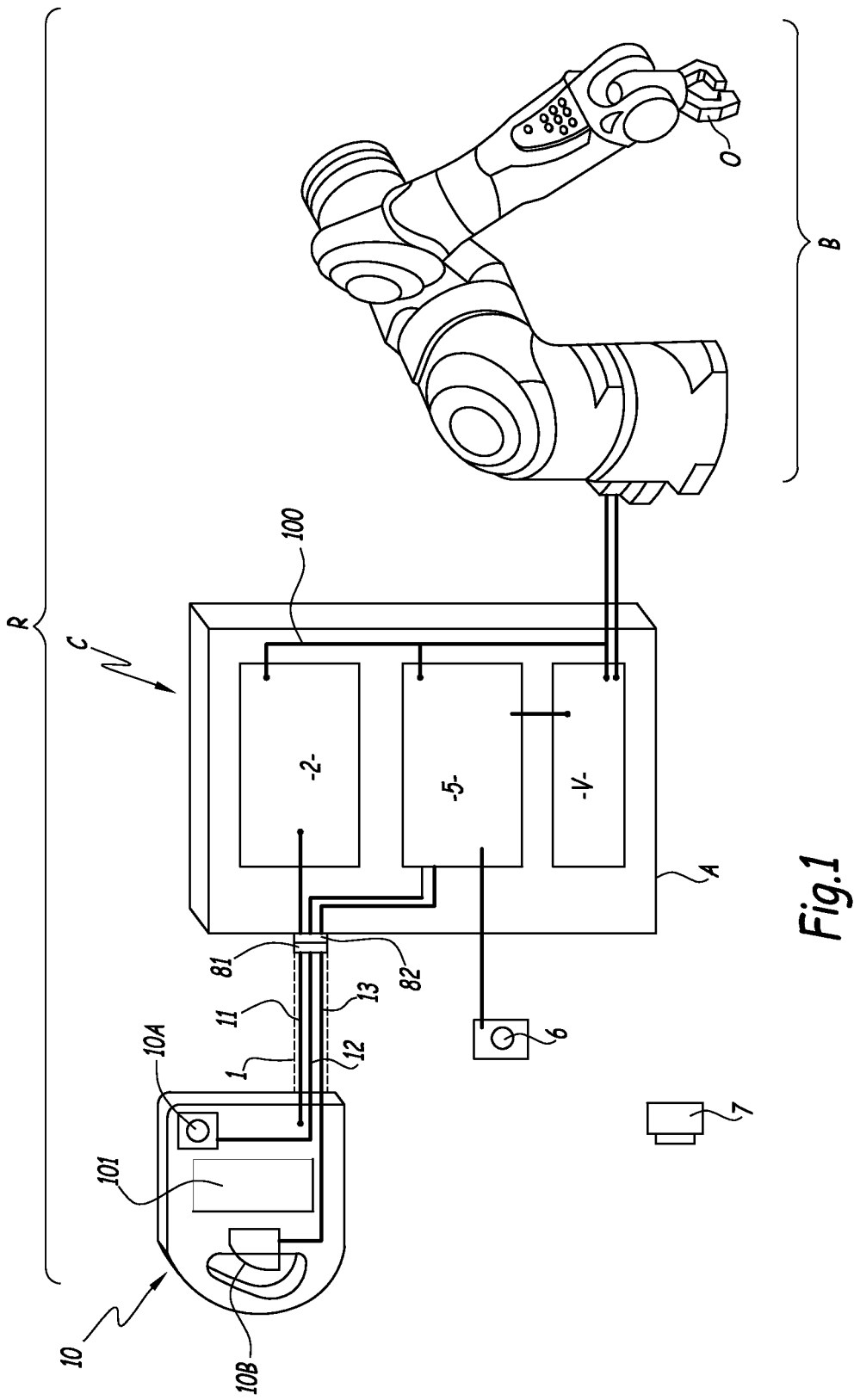
FIG. 1 is a diagrammatic view of a multi-axis robot according to the invention.

The arm B of the multi-axis robot R shown in FIG. 1 is provided with degrees of freedom, for example six, each commanded by a motor able to move a moving part of the robot arm B around geometric axes, to move a tool O in space. The motors are for example brushless three-phase motors. Each motor cooperates with an electromagnetic brake.

Position sensors or encoders are distributed in the robot arm B and make it possible to measure movement information relative to the degrees of freedom, for example the angular position of the moving parts around each of the axes.

Alternatively, the sensors measure the speed or acceleration of the moving parts, or a combination of movement information from among the position, speed and acceleration.

The robot arm B is controlled by a robot controller C positioned in a cabinet A separate from the robot arm B. The cabinet A in particular contains a central processing unit 2, power inverters V and a safety controller 5. These three elements 2, V and 5 communicate with one another by means of a shared bus 100.

A connection/disconnection contactor 6 of the manual control unit 10 is electrically connected to the safety controller 5. This contactor 6 is accessible from outside the cabinet A of the robot controller C and allows an operator to send a disconnection order to the robot controller C.

The central processing unit 2 is configured to execute programs for controlling the robot arm B. It generates the trajectory of the tool O from movement orders. The central processing unit 2 also computes angular positions to be reached for each of the degrees of freedom of the robot arm B, by applying a kinematic model associated with the robot arm B, as well as computing angular positions to be reached for each motor, taking any reductions and couplings into account. These position set points of the motors are sent to the inverter V of each motor.

The inverters V supply electricity for the phases of the motors and incorporate a torque cutoff function.

A manual control unit 10 communicates with the central processing unit 2 by means of an Ethernet link formed by a cable 11, and includes an interface for communicating with an operator, such as a touchscreen 101. This interface 101 allows an operator to send command orders to the robot R and receive operating information from the robot R, for example the position of the tool O. The manual control unit 10 has an emergency stop button 10A and a dead man contactor 10B. The emergency stop button 10A and the dead man contactor 10B are separately connected to the cabinet A, using two separate electrical connections 12 and 13.

All of the electrical connecting cables 11, 12 and 13 between the manual control unit 10 and the robot controller C are gathered in a single cord 1 provided at its free end with a first connector 81, designed to be connected with a second connector 82 of the manual control unit 10, situated on the cabinet A of the robot controller C.

As shown in FIGS. 2 and 3, the electrical connections 12 and 13 of the emergency stop button 10A and the dead man contactor 10B are each provided with a first cabling circuit AU1 or HM1 and a second cabling circuit AU2 or HM2, which guarantee a dual safety level.

The cabling circuits AU1 and AU2 of the emergency stop button 10A belong to the connection 12 and are each provided with a switch 91 or 92. The two switches 91 and 92 are closed by default, such that they allow the passage of the electrical current in the cabling circuits AU1 and AU2, and are mechanically connected so as to be synchronized with the emergency stop button 10A. In other words, pressing the emergency stop button 10A causes the two switches 91 and 92 to open simultaneously.

The cabling circuits HM1 and HM2 of the dead man contactor 10B belong to the connection 13 and are each provided with a switch 93 or 94. Both switches 93 and 94 are open by default, such that they prevent the passage of electrical current in the circuit HM1 and HM2. The switches 93 and 94 are mechanically connected in a synchronized manner to the dead man contactor 10B. Thus, pressing on the dead man contactor 10B causes simultaneous closure of the two switches 93 and 94.

For the cabling of the emergency stop 10A, the cord 1 of the manual control unit 10 and the connectors 81 and 82 include four electrical conductors, i.e., an input line eAU1 and an output line sAU1 belonging to the first cabling circuit AU1, and an input line eAU2 as well as an output line sAU2 belonging to the second cabling circuit AU2, within the cable of the electrical connection 12.

The switch 91 is inserted between the lines eAU1 and sAU1 of the first cabling circuit AU1 of the emergency stop button 10A. The switch 92 is inserted between the lines eAU2 and sAU2 of the second cabling circuit AU2 of the emergency stop button 10A.

Likewise, for the cabling of the dead man contactor 10B, the cord 1 of the manual control unit 10 and the connectors 81 and 82 include four additional electrical conductors, i.e., an input line eHM1 and output line sHM1 belonging to the first cabling circuit HM1, an input line eHM2 and output line sHM2 belonging to the second cabling circuit HM2, within the electrical connection 13.

The switch 93 is inserted between the lines eHM1 and sHM1 of the first cabling circuit HM1 of the dead man contactor 10B. The switch 94 is inserted between the lines eHM2 and sHM2 of the second cabling circuit HM2 of the dead man contactor 10B.

On the robot controller C side, each electrical line eAU1, sAU1, eAU2, sAU2, eHM1, sHM1, eHM2 and sHM2 is connected to the safety controller 5 so as to close each cabling circuit AU1, AU2, HM1 and HM2.

The safety controller 5 includes a computing unit 52 able to perform safety functions, based on information made accessible by the shared bus 100 input lines eAU1, eAU2, eHM1 and eHM2 and output lines sAU1, sAU2, sHM1 and sHM2 connected to the emergency stop 10A and the dead man contactor 10B. The computing unit 52 is able to verify whether a cabling circuit AU1, AU2, HM1 or HM2 is closed or open by applying an electric signal to its input line eAU1, eAU2, eHM1 or eHM2 and comparing this signal to a signal measured at the output line sAU1, sAU2, sHM1 or sHM2 of this circuit. The computing unit 52 is able to trigger an emergency stop of the robot arm B, during which the computing unit 52 activates the cutoff function of the torque of the inverters V.

During the use of the robot R, the safety controller 5 continuously monitors the cabling circuits of the emergency stop button AU1 and AU2 and the dead man contactor HM1 and HM2. This check is termed normal monitoring of the cabling circuits of the emergency stop button AU1 and AU2 and of the dead man contactor HM1 and HM2. More specifically, the safety controller 5 tests whether the current passes in each cabling circuit AU1, AU2, HM1 and HM2 and records the electrical state of each circuit. The safety controller 5 recovers the "0" logic information when the circuit is open, i.e., when the current does not pass, and the "1" logic information when the circuit is closed, i.e., when the current passes.

Hereinafter, (a, b) denotes the pair of logic information items of the cabling circuits AU1 and AU2 of the emergency stop button 10A, or the cabling circuits HM1 and HM2 of the dead man contactor 10B, respectively. Reference "a" is the electric state of the first cabling circuit AU1 or HM1, and "b" is the electric state of the second cabling circuit AU2 or HM2.

For the cabling circuits AU1 and AU2 of the emergency stop button 10A, the pair of logic information items (1, 1) recovered simultaneously corresponds to an authorized operating state of the robot arm B. The emergency stop button 10A is not actuated and the switches 91 and 92 are closed.

For the cabling circuits AU1 and AU2 of the emergency stop button 10A, the pair of logic information items (0, 0) recovered simultaneously corresponds to an emergency stop state of the robot arm B. The emergency stop button 10A is actuated and the switches 91 and 92 are open. The safety controller 5 then triggers the emergency stop, if it is not already activated.

For the cabling circuits AU1 and AU2 of the emergency stop button 10A, the pairs of logic information items (0, 1) and (1, 0) recovered simultaneously correspond to a malfunction of the cabling circuits AU1 or AU2. In both of these cases, the safety controller 5 triggers the emergency stop and emits a signal indicating a fault of the cabling circuits AU1 and AU2 of the emergency stop button 10A.

For the cabling circuits HM1 and HM2 of the dead man contactor 10B, the pair of logic information items (1, 1) recovered simultaneously corresponds to an actuation of the dead man circuits 10B by an operator. The manual control unit 10 is activated and the unit 10 is authorized to control the robot arm B. The switches 93 and 94 are closed.

For the cabling circuits HM1 and HM2 of the dead man contactor 10B, the pair of logic information items (0, 0) recovered simultaneously corresponds to a deactivated state of the manual control unit 10 in which the central processing unit 2 no longer takes into account commands from the manual control unit 10. The operator does not act on the dead man contactor 10B. The switches 93 and 94 are open.

The pairs of logic information items (0, 1) and (1, 0) recovered simultaneously on the cabling circuits HM1 and HM2 correspond to malfunctions of the cabling circuits HM1 or HM2. In both of these cases, the safety controller 5 triggers the emergency stop and emits a signal of a fault of one of the cabling circuits HM1 and HM2 of the dead man contactor 10B.

The robot controller C further comprises a stopper 7, shown diagrammatically in FIG. 3, designed to be connected to the second connector 82 of the cabinet A, on the robot controller C, in place of the first connector 81, when the manual control unit 10 has been removed. When the stopper 7 is connected to the second connector 82, the electric lines eAU1 and sAU1 of the first cabling circuit AU1 of the emergency stop button 10A are connected to one another electrically by means of electric conductors 7AU of the stopper 7. Likewise, the electrical lines eHM1 and sHM1 of the first cabling circuit HM1 of the dead man contactor 10B are electrically connected to one another by means of electric conductors 7HM of the stopper 7. The stopper 7 does not include means for closing the cabling circuits AU2 and HM2. When the stopper 7 is connected to the connector 82, the cabling circuits AU2 and HM2 are open.

Alternatively, the stopper 7 electrically connects the electrical lines eAU2 and sAU2 of the second emergency stop circuit AU2, and the electrical lines eHM2 and sHM2 of the second dead man circuit HM2, while the electrical lines eAU1 and sAU1 of the first emergency stop circuit AU1 and the electrical lines eHM1 and sHM1 of the first dead man circuit HM1 are not connected, such that the stopper 7 only closes the circuits AU2 and HM2, while the circuits AU1 and HM1 remain open.

Thus, the stopper 7 electrically connects the input and output lines of only one of the two cabling circuits AU1 or AU2 of the emergency stop button 10A, and the input and output lines of only one of the two cabling circuits HM1 and HM2 of the dead man contactor 10B.

The next part of the description relates to a method for disconnecting the manual control unit 10, for the disconnection between the manual control unit 10 and the robot controller C.

In a first step a), when an operator wishes to disconnect the manual control unit 10 from the robot controller C, he uses the interface 101 to select the disconnection function of the manual control unit 10. This disconnection request is sent to the central processing unit 2, which records the order and sends it to the safety controller 5.

Alternatively, the disconnection order is sent to the safety controller 5 by the disconnection contactor 6.

In a second step b) after the step a), the safety controller 5 suspends the control of the cabling circuits AU1, AU2, HM1 and HM2 of the emergency stop button 10A and the dead man contactor 10B during a predetermined length of time t1, for example 30 seconds, starting as of the disconnection request. In other words, the safety controller 5 does not trigger the emergency stop even if the pairs of logic information items of the cabling circuits AU1 and AU2 are different from (1, 1). Thus, the activation function of the torque cutoff, performed by the safety controller 5, is deactivated.

In a third step c), after the step b), the safety controller 5 then conducts a test of the cabling circuits AU1, AU2, HM1 and HM2 of the emergency stop button 10A and the dead man contactor 10B.

This test consists of verifying two conditions X and Y. According to the first condition X, one emergency stop circuit AU1 or AU2 is open while the other circuit AU2 or AU1 is closed, which corresponds to the pairs of logic information items (0, 1) and (1, 0). According to the second condition Y, one dead man circuit HM1 or HM2 is open, while the other circuit HM2 or HM1 is closed, which corresponds to the pairs of logic information items (0, 1) and (1, 0).

(a, b, c, d) denotes the quadruplet of logic information items of the cabling circuits AU1, AU2, HM1 and HM2. "a" is the electric state of the first cabling circuit of the emergency stop button AU1, "b" is the electric state of the second cabling circuit of the emergency stop button AU2, "c" is the electric state of the first cabling circuit of the dead man contactor HM1 and "d" is the electric state of the second cabling circuit of the dead man contactor HM2.

With the stopper 7 of the example shown in the figures, the two conditions X and Y are met when the logic information of the cabling circuits AU1, AU2, HM1 and HM2 are equal to (1, 0, 1, 0).

During the second step b), if an operator disconnects the cord 1 from the manual control unit 10 and connects the stopper 7 on the second connector 82 during the predetermined length of time t1, then the safety controller 5 detects, during the third step c), that the two conditions X and Y are met, i.e., the single cabling circuit AU1 of the emergency stop button 10B is closed and a single cabling circuit HM1 of the dead man contactor 10B is closed. The safety controller 5 closes the test procedure without triggering the emergency stop. During the test procedure, the safety controller 5 simultaneously analyzes the electric state of the cabling circuits AU1 and AU2 of the emergency stop button 10A and of the cabling circuits HM1 and HM2 of the dead man contactor 10B.

In the third step c, at the end of the predetermined length of time t1 after the disconnection request, and if the conditions X and Y are not met, the safety controller 5 triggers the emergency stop. In a first case, this means that the operator has not connected the cord 1 and that the manual control unit 10 is still connected at the end of the predetermined length of time t1. This configuration corresponds to the logic information (1, 1, 0, 0). The emergency stop triggered by the safety controller 5 then allows the operator to disconnect the manual control unit 10 securely, by disconnecting the cord 1. The logic information items of the cabling circuits AU1, AU2, HM1 and HM2 are then equal to (0, 0, 0, 0). The test procedure ends.

In a second case, the two conditions X and Y are not met when the operator has disconnected the cord 1, but has not connected the stopper 7 on the second connector 82 at the end of the predetermined length of time t1. The logic information items of the circuits AU1, AU2, HM1 and HM2 are then equal to (0, 0, 0, 0). The operator must then connect the stopper 7 of the second connector 82 so that conditions X and Y are met and the test procedure ends. The emergency stop being triggered, the user can connect the stopper 7 completely safely.

Thus, at the end of the predetermined length of time t1, the safety controller 5 does not trigger an emergency stop of the robot arm B if and only if on the one hand, only one of the two cabling circuits AU1 and AU2 of the emergency stop button 10A is open and, on the other hand, only one of the two cabling circuits HM1 and HM2 of the dead man contactor 10B is open. In the example of the stopper 7 shown in the figures, this corresponds to the quadruplet of logic information items (1, 0, 1, 0). Alternatively, it may involve the following configurations: (1, 0, 0, 1), (0, 1, 0, 1) or (0, 1, 1, 0).

There are four operating configurations with no hardware failure of the robot:
  when the cabling circuits AU1, AU2, HM1 and HM2 are all open: (0, 0, 0, 0),
  when the cabling circuits AU1, AU2, HM1 and HM2 are all closed: (1, 1, 1, 1),
  when the two cabling circuits AU1 and AU2 of the emergency stop button 10A are open while the two cabling circuits of the dead man contactor 10B are closed: (0, 0, 1, 1),
  when the two cabling circuits AU1 and AU2 of the emergency stop button 10A are closed while the two cabling circuits of the dead man contactor 10B are open: (1, 1, 0, 0).

In order for an operating error to result in the robot controller C erroneously detecting the presence of the stopper 7 whereas it has not been placed, and erroneously not triggering the emergency stop, it is necessary for two failures to occur simultaneously, i.e., a first failure regarding the electric state of only one of the cabling circuits AU1 and AU2 of the emergency stop button 10A, and a second failure regarding the electric state of only one of the cabling circuits HM1 and HM2 of the dead man contactor 10B.

Thus, the disconnection procedure is according to the safety principles requiring a safe detection of failures of the safety system of the robot controller C.

The next part of the document relates to a method for connecting the manual control unit 10 to the robot controller C, which includes three successive steps a'), b') and c').

In the first step a'), the operator removes the stopper 7. This step may follow the reconnection of the stopper 7, during the disconnection method, as described above.

In the second step b'), the safety controller 5 detects the removal of the stopper 7 by applying an electric signal to each input line eAU1, eAU2, eHM1 or eHM2 and comparing this signal to a signal measured at the output line sAU1, sAU2, sHM1 or sHM2 of this circuit. When the stopper 7 is disconnected, the logic information items of the circuits AU1, AU2, HM1 and HM2 are equal to (0, 0, 0, 0). The safety controller 5 then suspends the control of the cabling circuits AU1, AU2, HM1 and HM2 so as not to trigger an emergency stop during a second predetermined length of time t2 starting upon removal of the stopper 7, for example 30 seconds.

In the third step c'), the safety controller 5 then conducts a test sequence of the electric state of the cabling circuits AU1, AU2, HM1 and HM2, as described in step c) of the disconnection method.

If the two conditions X and Y previously set out are not met at the end of the second predetermined length of time t2, the safety controller 5 considers that the stopper 7 is still missing and reactivates the control of the cabling circuits AU1, AU2, HM1 and HM2 of the emergency stop button 10A and the dead man contactor HM1 and HM2. It is then able to perform the normal monitoring function of the circuits AU1, AU2, HM1 and HM2. The connection method ends.

If the manual control unit 10 is connected and the two cabling circuits AU1 and AU2 of the emergency stop button 10A are closed, the safety controller 5 does not trigger an emergency stop. If the manual control unit 10 is not connected, then the safety controller 5 triggers the emergency stop, since it will have detected that the two cabling circuits AU1 and AU2 of the emergency stop button 10A are open.

If the two conditions X and Y are met, this means that the stopper 7 has been reconnected and that the robot controller C has returned to the preceding configuration. The connection method ends.

In this way, the connection procedure is also according to the safety principles requiring the safe detection of failures of the safety system of the robot controller C. The emergency stop is triggered if, at the end of the second predetermined length of time t2, the user has not reconnected the manual control unit 10 or has not reconnected the stopper 7.

The invention applies to all types of multi-axis robots.

In the context of the invention, the described alternatives may be combined with each other, at least in part.

The invention claimed is:

1. A method for disconnecting a manual control unit of a multi-axis robot, the manual control unit including:
    an emergency stop button,
    a dead man contactor,
    a connecting cord for connecting the manual control unit to a robot controller, the connecting cord including:
        an input power line and an output power line for each of two cabling circuits of the emergency stop button, and
        an input power line and an output power line for each of two cabling circuits of the dead man contactor,
    the robot controller including:
        a central processing unit configured to execute programs for commanding a robot arm, and
        a safety controller configured to test the two cabling circuits of the emergency stop button and the two cabling circuits of the dead man contactor, and trigger an emergency stop of the robot arm,
    wherein the method comprises successive steps, in which:
        a) an operator makes a request to disconnect the manual control unit,
        b) during a predetermined length of time started upon the disconnection request, the safety controller suspends the control of the two electrical cabling circuits of the emergency stop button and of the two cabling circuits of the dead man contactor so as not to trigger the emergency stop,
        c) at the end of the predetermined length of time, the safety controller does not trigger an emergency stop of the robot arm if and only if, on the one hand, only one of the two cabling circuits of the emergency stop button is open and, on the other hand, only one of the two cabling circuits of the dead man contactor is open.

2. The method according to claim 1, wherein during step b), an operator connects a stopper to the robot controller in place of the cord, the stopper closing only one of the two cabling circuits of the emergency stop button and closing only one of the two cabling circuits of the dead man contactor.

3. The method according to claim 2, wherein the method further comprises subsequent steps, in which:
    a') an operator removes the stopper,
    b') during a second predetermined length of time started upon removal of the stopper, the safety controller suspends the control of the two electrical cabling circuits of the emergency stop button and of the two cabling circuits of the dead man contactor so as not to trigger the emergency stop,
    c') at the end of the second predetermined length of time, the safety controller triggers the emergency stop if the two cabling circuits of the emergency stop button are open and if the two cabling circuits of the dead man contactor are open.

4. The method according to claim 1, wherein during step a), the disconnection request is done using the manual control unit.

5. The method according to claim 4, wherein the disconnection request order is received by an interface of the manual control unit.

6. The method according to claim 1, wherein during step a), the disconnection request is done using a disconnection contactor connected to the safety controller.

7. A multi-axis robot including a manual control unit that includes:
    an emergency stop button,
    a dead man contactor,
    a connecting cord for connecting the manual control unit to a robot controller, the connecting cord including:
        an input power line and an output power line for each of two cabling circuits of the emergency stop button, and
        an input power line and an output power line for each of two cabling circuits of the dead man contactor,
    the robot controller including:
        a central processing unit configured to execute programs for commanding a robot arm, and
        a safety controller configured to test the two cabling circuits of the emergency stop button and the two cabling circuits of the dead man contactor, and trigger an emergency stop of the robot arm, wherein, at the end of a predetermined length of time started upon a disconnection request, the safety controller does not trigger an emergency stop of the robot arm if and only if, on the one hand, only one of the two cabling circuits of the emergency stop button is open and, on the other hand, only one of the two cabling circuits of the dead man contactor is open,
    wherein the multi-axis robot further comprises a stopper configured, when it is connected to the robot controller in place of the cord, to close only one of the two cabling circuits of the emergency stop button and only one of the two cabling circuits of the dead man contactor.

8. The multi-axis robot according to claim 7, wherein the manual control unit comprises an interface configured to receive the disconnection request.

9. The multi-axis robot according to claim 7, wherein the robot controller comprises a disconnection contactor connected to the safety controller and configured to receive the disconnection request.

* * * * *